3,092,747
PROPORTIONAL COUNTER
Samuel Fine, New York, and Charles F. Hendee, Hartsdale, N.Y., assignors to North American Philips Company, Inc., New York, N.Y., a corporation of Delaware
Filed Jan. 9, 1959, Ser. No. 785,828
3 Claims. (Cl. 313—93)

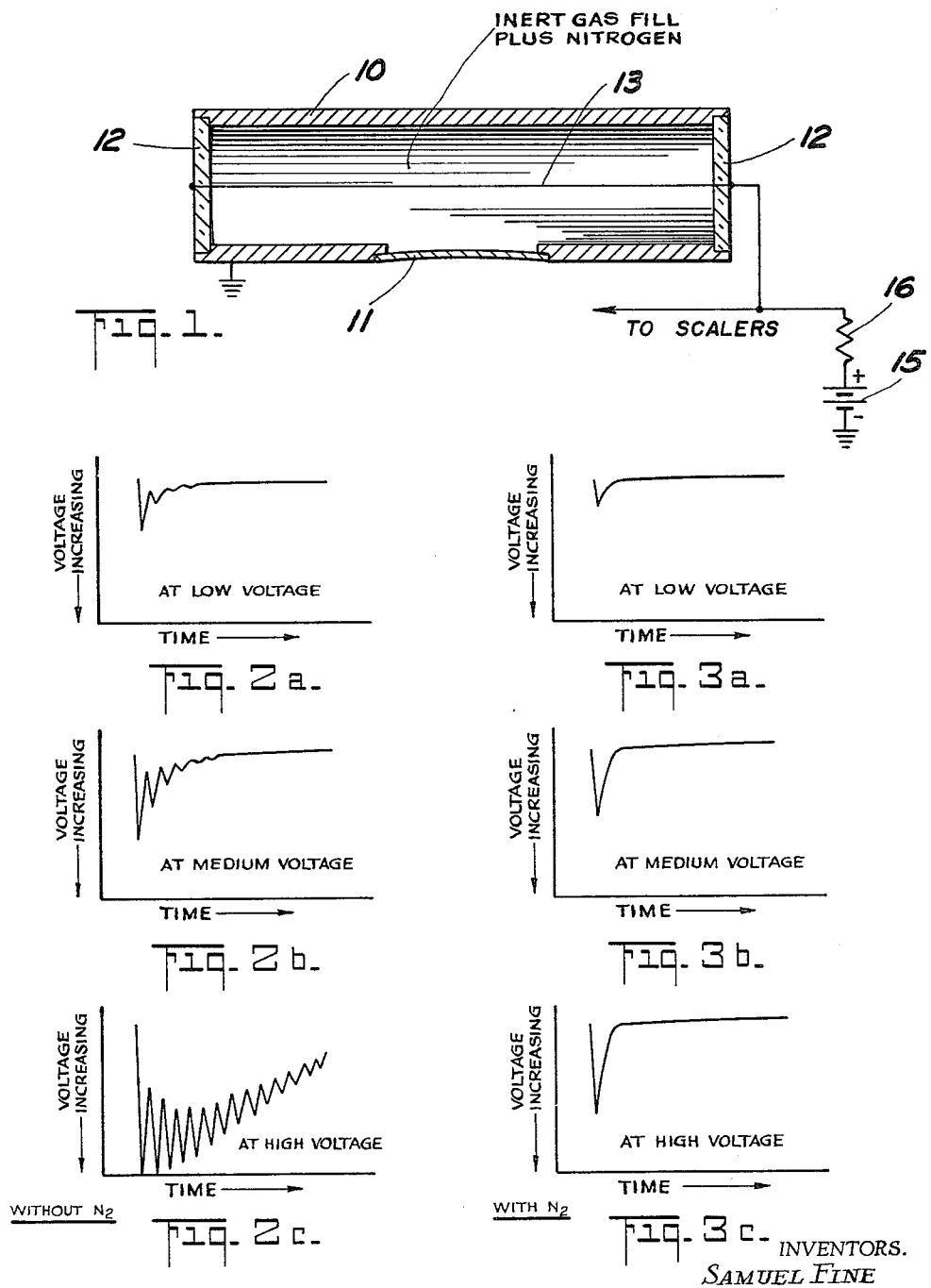

This invention relates to proportional counters, and in particular to gas-type proportional counters capable of infinite lifetime.

Gas-type proportional counters are frequently employed for detecting X-rays and alpha and beta particles, and possess the advantage that their output pulses have a magnitude proportional to the energy of the incident radiation or particle being detected. Inert gases have been employed as the filling gas for such counters as they exhibit good absorption for this particular range of energies being detected. As a pure inert gas remains unaffected by electrical discharges within it, tubes containing only inert gas are known as infinite-life detectors. This is in contrast to tubes containing inert gas with a small admixture of an organic gas as a quench. During the gas discharges, the organic gas gradually decomposes into its elemental components, and the end of life of such a tube is reached when a substantial amount of the original organic gas has been lost. For this reason, it is also important to avoid the application of overvoltages to such tubes because this establishes glow discharges which cause a rapid deterioration of its operating characteristics and a sharp reduction in its lifetime. Therefore, there has been a trend in the art to the use of the pure unquenched inert gas in such detectors.

The major difficulty associated with the pure inert gas as a fill for a proportional counter tube is that the tube exhibits so-called "afterpulsing" when the voltage is adjusted so that moderate gas gain obtains. What this means is that upon excitation by radiation of an energy content capable of being detected by such a tube, not only does the tube produce output pulses in response to that incident radiation, but each true pulse is followed by a group of spurious afterpulses of various magnitudes which are not meaningfully related to the incident energy being detected. This not only results in spurious count rates but it also broadens the pulse height distribution, which is undesirable for a well-operating proportional counter. Moreover, for detecting low-energy X-ray quanta, the voltage applied to the counter must be increased to afford enough gas gain so that high signal-to-noise ratios are obtained. But this also increases the size and number of the spurious afterpulses, and in some cases actually leads to breakdown of the tube.

The main object of the invention is to provide a proportional counter tube containing an inert gas as the primary radiation absorber and afforded with means for preventing afterpulsing but without limiting the lifetime of such tubes.

These and other objects of the invention are realized by adding nitrogen to the inert gas in the proportional counter tube. It was found that a nitrogen-quenched, inert gas-filled proportional counter exhibits absolutely no afterpulses, is able to withstand frequent breakdown without affecting its operating characteristics, and is unlimited in lifetime insofar as the gas filling is concerned.

The invention will now be described in greater detail with reference to the accompanying drawing, in which:

FIG. 1 is a cross-sectional view of a proportional counter containing the gas filling of the invention;

FIGS. 2a, 2b and 2c show oscilloscope displays illustrating afterpulsing in a pure inert-gas-filled proportional counter tube;

FIGS. 3a, 3b and 3c show oscilloscope displays illustrating the output pulses of a nitrogen-quenched inert-gas-filled proportional counter tube in accordance with the invention.

FIG. 1 is a cross-sectional view of a proportional counter tube with which the invention may be illustrated. It comprises a cylindrical metal shell 10 containing a thin beryllium-foil entrance window 11 for radiation in its side wall. Insulators 12 are sealed in opposite ends of the metal shell and support along the center of the cylinder a thin metal wire 13. This metal wire 13, as is well-known, constitutes the anode electrode of the radiation counter, and the inside conductive surface of the shell 10 constitutes the cathode electrode. To these two electrodes is applied a suitable potential via a source of potential 15, and the output pulses produced are developed across a load resistor 16. In the usual way, these pulses are then amplified and counted directly in scalers or first analyzed in accordance with their magnitudes and then counted over certain voltage intervals. The interior of this sealed-off tube is filled with an inert gas at the usual low pressure of about 300 mms. of mercury for absorbing incident X-radiation. For a more complete description of such a device, attention is directed to our United States Patent No. 2,836,677. While the invention is being described in connection with this side-window cylindrical geometry form of proportional counter, it will be appreciated that the results of the invention can be obtained with any of the other known proportional counter geometries and constructions and it is not intended to limit the scope of the claims by this specific example.

FIG. 2 illustrates the afterpulsing phenomena with a pure xenon-filled tube as described in connection with FIG. 1. In this particular case, the incident radiation was manganese K-alpha with an energy content of 5.9 kev., and potentials of 1850 volts, 1900 volts and 1950 volts were applied to the tube in succession, producing on the face of an oscilloscope coupled to the output of the proportional counter the three pulse patterns illustrated in FIGS. 2a, 2b and 2c, respectively. As is usual in such displays, the abscissa represent time, and the ordinate in the downward direction represents voltage magnitude of the pulses. As will be noted, there is a first pulse at the beginning of the trace which actually is the true pulse, in that its magnitude is proportional to the energy of the incident radiation. However, it will be noted that following it are several smaller pulses which is the afterpulsing referred to earlier. The traces going from top to bottom indicate the effect of increasing the voltage and thus the gas gain in the tube, from which it will be noted that the afterpulsing becomes more severe and, in the case of FIG. 2c, the tube has actually broken down and a continuous discharge exists. It will be evident that such a pulse pattern at the output of the proportional counter is highly disadvantageous.

In accordance with the invention, the afterpulsing is completely eliminated without affecting the desirable characteristic of the proportional counter and without limiting its lifetime by adding to the inert gas some nitrogen gas. For reasons not yet fully understood, this produces no apparent effect on the electrical characteristics of the proportional counter except to eliminate the afterpulsing. FIGS. 3a, 3b and 3c illustrate the same tube as in FIG. 2 with the notrogen-xenon filling of the invention and operated under the same conditions as in FIGS. 2a, 2b and 2c, from which it will be evident that no afterpulsing has occurred. Moreover, it was also found that the tube could be broken down at will and for any length of time desired and then returned to operable condition without changing any of its operating characteristics. There was an immediate recovery by the tube to its original operating condition. Finally, since both the inert gas and the nitrogen are relatively inert and are elemental gases, the life of the tube is infinite, in contrast to the organic-quenched tubes previously described.

It is important that the nitrogen be free of oxygen when introduced into the proportional counter of the invention. Oxygen is a highly electronegative gas molecule and its presence prevents proportional counter operation by tying up free molecules or ions in the tube. This excessively broadens or smears the desirable narrow pulse height distribution of a well-operating proportional counter. For this reason, satisfactory results have not been obtained with air or nitrogen-oxygen compound additions to the inert gas.

The amount of the nitrogen addition can be varied over a rather wide range. It has been found that at least 1% by volume is needed before suppression of the afterpulses is effected. As the total gas pressure may be varied over a wide range, depending upon the application of the counter, care should be taken to ensure that the nitrogen partial pressure does not fall below about 5 mms. of mercury, which means then that at least a minimum amount of nitrogen atoms will be present in the fill. Moreover, in order to provide proper absorption for the incidental radiation, the inert gas should not be less than about 30% of the total gas pressure. There follow below examples of suitable mixes, in volume percent, for proportional counters in accordance with the invention for detecting different kinds of radiation with high efficiency. For detecting low-energy X-rays, 93% xenon and 7% of nitrogen at a total gas pressure of 300 mms. of mercury was very satisfactory. For detecting beta particles, neon would be preferred as the inert gas, with a small amount of the nitrogen to eliminate the afterpulsing, at a total gas pressure of, say, 200 mms. of mercury. If a low-voltage proportional counter tube is desired, satisfactory results may be obtained with neon-argon mixtures and of course the nitrogen. The total pressure of the gas fill generally varies between about one-tenth of a millimeter and atmospheric. In this pressure range, best results have been obtained when the nitrogen addition was in the range of 3 to 20% of the total gas pressure.

While we have described our invention in connection with specific embodiments and applications, other modifications thereof will be readily apparent to those skilled in this art without departing from the spirit and scope of the invention as defined in the appended claims.

What is claimed is:

1. A radiation-detecting, gas-type proportional counter comprising a cathode electrode and an anode electrode and between the electrodes a gas filling free of oxygen consisting essentially of an inert gas, means applying between the electrodes a potential at which, when external radiation is absorbed by the gas filling generating electron-ion-pairs by ionization, the said electrons and ions are accelerated toward the electrodes at a rate causing further ionization and multiplying the number of electrons and ions present by a Townsend avalanche, which electrons and ions when collected by the electrodes produce a current pulse whose magnitude is proportional to the energy of the absorbed external radiation, said potential also having a value at which the said proportional current pulse tends to be followed by a group of unwanted spurious afterpulses, and means for eliminating the said spurious afterpulses without substantially limiting the lifetime of the counter, said means comprising between 1% and 70% by volume of oxygen-free nitrogen gas added to the gas filling.

2. A radiation-detecting, gas-type proportional counter comprising a cathode electrode and an anode electrode and between the electrodes a gas filling free of oxygen consisting essentially of an inert gas, means applying between the electrodes a potential at which, when external X-radiation is absorbed by the gas filling generating electron-ion-pairs by ionization, the said electrons and ions are accelerated toward the electrodes at a rate causing further ionization and multiplying the number of electrons and ions present by a Townsend avalanche, which electrons and ions when collected by the electrodes produce a current pulse whose magnitude is proportional to the energy of the absorbed X-radiation, said potential also having a value at which the said proportional current pulse tends to be followed by a group of unwanted spurious afterpulses, and means for eliminating the said spurious afterpulses without substantially limiting the lifetime of the counter, said means comprising between 3% and 20% by volume of oxygen-free nitrogen gas added to the gas filling.

3. A proportional counter as set forth in claim 2 wherein the inert gas is xenon, and the nitrogen content is about 7% of the total gas volume.

References Cited in the file of this patent

UNITED STATES PATENTS 2,503,302   Shore _____ Apr. 11, 1950
2,929,932   Bouricius et al. _____ Mar. 22, 1960

OTHER REFERENCES

Electron and Nuclear Counters, by S. A. Korff, second edition, published by D. Van Nostrand Co., New York, N.Y., 1946, 1955; pp. 226, 227.